United States Patent
Yeo

(10) Patent No.: US 6,916,524 B1
(45) Date of Patent: Jul. 12, 2005

(54) OUTER LAYER AND ELEMENT WITH MARKINGS, AND METHOD OF MANUFACTURING SAME

(75) Inventor: Keng Kit Yeo, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 97 days.

(21) Appl. No.: 09/869,711

(22) PCT Filed: Nov. 6, 2000

(86) PCT No.: PCT/EP00/11005

§ 371 (c)(1),
(2), (4) Date: Jul. 2, 2001

(87) PCT Pub. No.: WO01/34401

PCT Pub. Date: May 17, 2001

(30) Foreign Application Priority Data

Nov. 11, 1999 (WO) ............................ PCT/SG99/00122

(51) Int. Cl.[7] ..................... B32B 15/08; A47G 35/00; C08K 9/06
(52) U.S. Cl. .................. 428/195.1; 428/416; 428/418; 428/542.2; 428/913.3; 523/213; 523/212
(58) Field of Search .............................. 428/195.1, 416, 428/418, 542.2, 913.3, 195; 523/213, 212; 430/270.12

(56) References Cited

U.S. PATENT DOCUMENTS

| 5,592,766 A | 1/1997 | Mygatt |
| 5,789,466 A | 8/1998 | Birmingham, Jr. |
| 5,853,955 A | 12/1998 | Towfiq |
| 5,855,969 A | 1/1999 | Robertson |

FOREIGN PATENT DOCUMENTS

| DE | 4446874 | 7/1996 |
| EP | 0710570 | 5/1996 |
| FR | 2649628 | 1/1991 |

*Primary Examiner*—Rena Dye
*Assistant Examiner*—Lawrence Ferguson

(57) ABSTRACT

A marking (4, 5) is formed in an outer layer (3; 23; 43) comprising a polymer material with an inorganic main chain and with certain visual properties by at least one region (9; 29; 49) of the outer layer (3; 23; 43) of which at least one of the visual properties shows a deviation, visible to the human eye, from the same property in other regions (9; 29; 49?) of the outer layer (3; 23; 43). Since the marking (4, 5) is obtained by means of at least a locally changed visual property of material of the outer layer (3; 23; 43) itself, the marking (4, 5) does not constitute a substantial interruption of the outer layer (3; 23; 43), and the application of the marking (4, 5) does not cause any substantial unevennesses in the outer layer (3; 23; 43). The following are further described: an element having such an outer layer (3; 23; 43) and a method of applying such a marking (4, 5).

11 Claims, 2 Drawing Sheets

OUTER LAYER AND ELEMENT WITH MARKINGS, AND METHOD OF MANUFACTURING SAME

The invention relates to an outer layer comprising a polymer material with certain visual properties and to an element having such an outer layer.

An example of an element having such an outer layer and designed for consumer products is known from U.S. Pat. No. 5,592,766. This element is constructed as a sole plate of an electric iron. The outer layer is particularly suitable for such an application because it has very good sliding properties during ironing, a high resistance to scratching, can be easily cleaned, can be provided in a simple manner and at low cost against the soleplate, is well resistant to corrosion, and is resistant to fast temperature changes up to 300° C. Examples of alternative applications in elements for consumer products, where a layer of polymer material with an inorganic main chain is particularly suitable on account of at least a number of the above properties, are surfaces which come into intensive sliding contact with the user's skin, such as portions of electric-shaver heads, barbers' implements, writing tools and other tools or mechanically loaded surfaces which are fairly strongly heated during use and which should be easy to clean, such as hot plates and oven walls.

It is problem to provide such outer layers with markings without the latter causing interruptions in the outer layer, where the protective effect of the outer layer would be absent, or spots of roughness in the outer layer, where dirt can accumulate and which adversely affect the sliding properties.

It is an object of the invention to provide a solution to the above problem.

This object is achieved according to the invention in that the outer layer is provided with a marking formed by at least a region of said outer layer of which at least one of said visual properties is different from the corresponding property of other regions of said outer layer, which difference is visible to the human eye.

The invention further relates to an element provided with such an outer layer, and to a method of marking an outer layer comprising a polymer material with an inorganic main chain and having visual properties, which method comprises the provision of changes visible to the human eye in at least one of said visual properties in at least one region of said outer layer, whereby said at least one region forms a visible marking in said outer layer when viewed frontally.

Since the marking is obtained by means of at least one locally changed visual property of the material of the outer layer itself, the marking does not constitute a substantial interruption in the outer layer, and the provision of the marking does not cause any substantial unevennesses in the outer layer.

Particular embodiments of the invention have been defined in the dependent claims.

Figure 1:
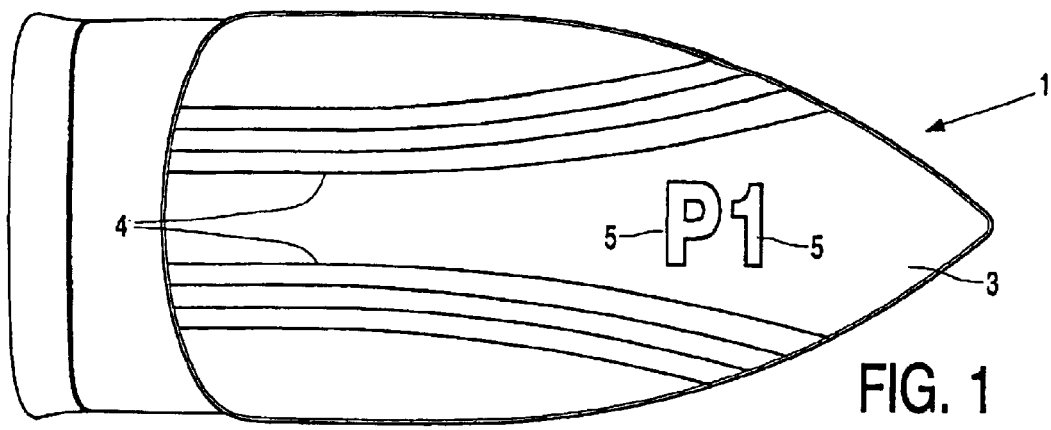
Figure 2:
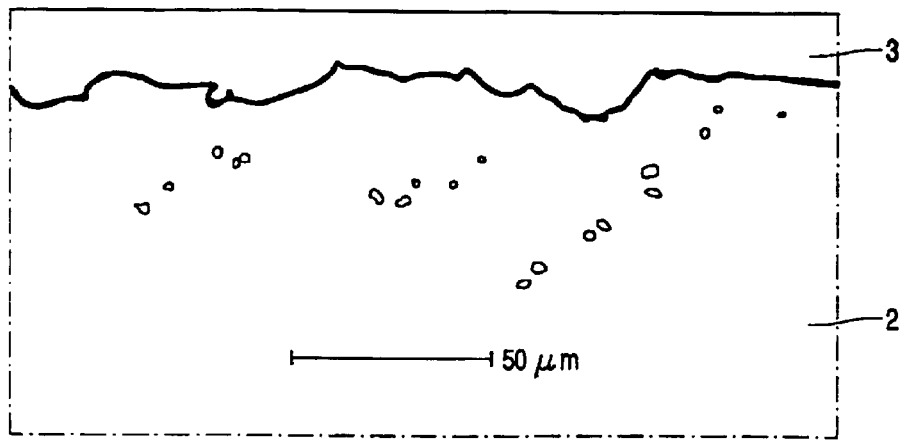
Figure 3:
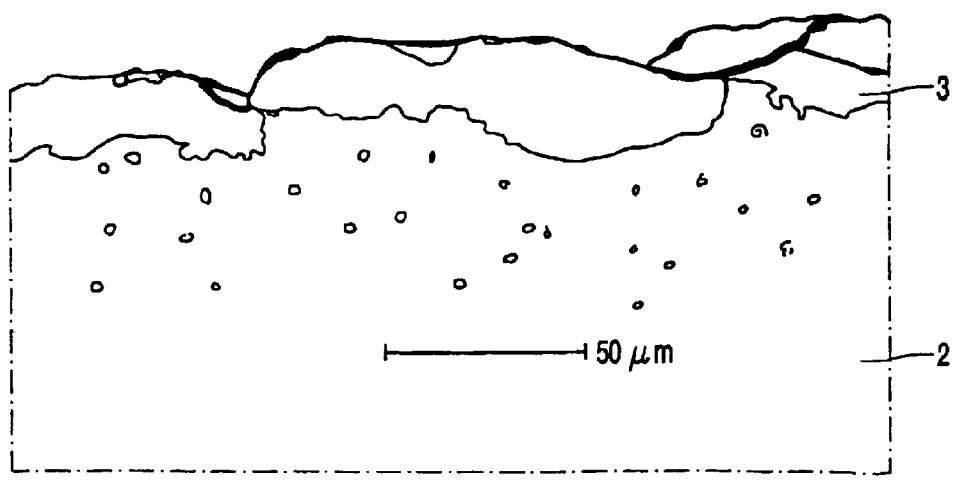
Figure 4:
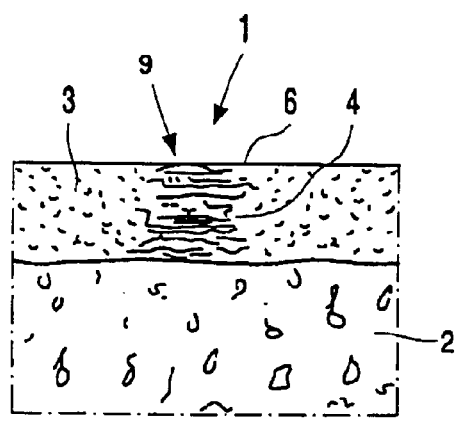
Figure 5:
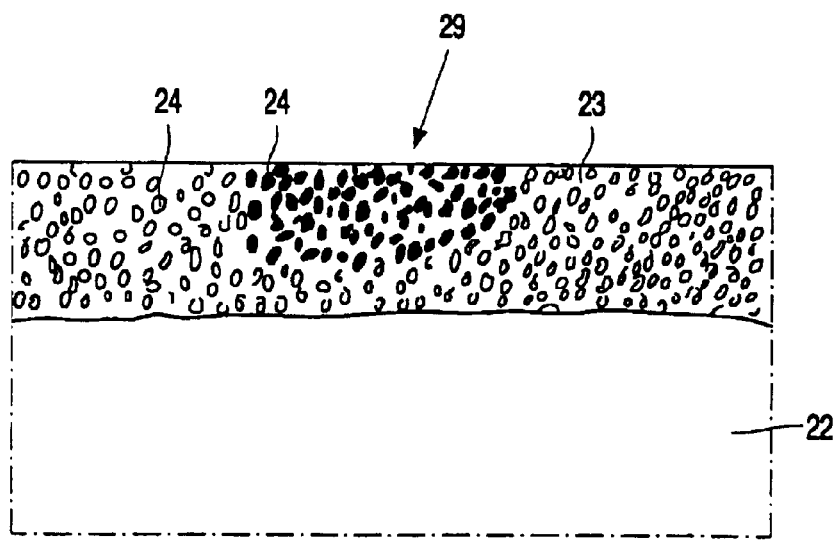
Figure 6:
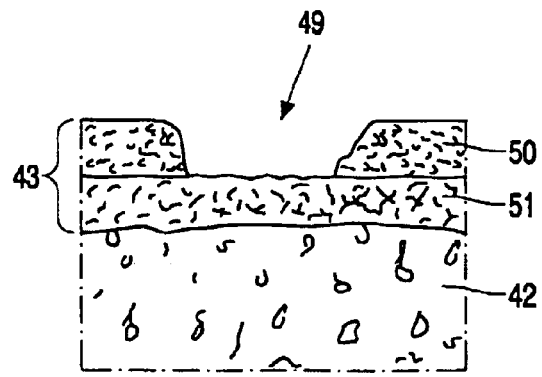

Further objects, aspects, effects, advantages, and details of the invention will become apparent in the following description of a few embodiments of the invention, for which reference is made to the drawing, in which FIG. 1 is a bottom view of a sole of an electric iron, FIG. 2 is a cross-sectional view on an enlarged scale of a portion of the sole of the electric iron of FIG. 1 which has not been treated for providing a marking, FIG. 3 is a cross-sectional view on an enlarged scale of a portion of the sole of the electric iron of FIG. 1 which has been treated for the provision of a marking, FIG. 4 is a diagrammatic picture of a marking as partly shown in FIG. 3, FIG. 5 is a diagrammatic cross-sectional view of a boundary area of a carrier and a layer of polymer material in an alternative embodiment, and FIG. 6 is a diagrammatic cross-sectional view of a boundary area of a carrier and a layer of polymer material in a further alternative embodiment.

An example of an element according to the invention is formed by the sole 1 of an electric iron shown in various ways in FIGS. 1 to 4.

This sole is built up inter alia from a carrier 2 of metal or a metal alloy which supports an outer layer 3. The sole may further comprise an anodized layer, in which case the anodized layer supports the outer layer 3. This outer layer 3 forms a sliding or contact layer 3 of the sole 1. Said outer layer 3 is formed from a polymer material, in this example on the basis of polysilicate which was provided in a sol-gel process. The main chain or backbone of the polymer is inorganic; any lateral chains or branches may be organic, if so desired. The outer layer 3 is provided with markings in the form of decorative lines 4 and characters 5. The latter may form, for example, a type indication.

The outer layer 3 in which the markings 4, 5 are provided was obtained in that a sol-gel substance was provided on the carrier 2, and the sol-gel substance was subsequently converted into the polymer material with an inorganic main chain of the outer layer 3.

The markings 4, 5 are formed in that visual properties—in this example shade of darkness and color—of regions 9 of the outer layer 3 exhibit a clearly visible difference from the corresponding visual properties of the other regions of the outer layer 3. In this example, the outer layer has a yellow ocher color, whereas the markings are of a darker color and more brownish. Since the markings form part of the outer layer 3, their presence has no substantial negative effect on the sliding properties of the outer layer, the protective effect of the outer layer 3, and the dust-repellent properties of the outer layer 3.

When the markings 4, 5 are provided, changes are applied in the visual properties of the outer layer 3 in those regions of the outer layer 3 which are destined to form the markings 4, 5 in the outer layer when viewed frontally.

Compared with the separate provision of portions of the outer layer 3 with deviating visual properties in the areas of the markings, the above offers the advantage that the provision of the outer layer 3 can be carried out in one step or series of steps. It is further achieved thereby that the markings 4, 5 are formed integrally with other portions of the outer layer 3, so that the screening effect of the outer layer 3 over the surface of the sole 1 remains intact also after a long period of use and a corresponding large number of fast and major temperature changes. As is evident from FIG. 3, the outer layer 3 may be locally very thin, or locally interrupted after treatment. Such a minor local defect in the outer layer 3 does not adversely affect the durability of the outer layer 3.

The changes in the visual properties discussed above are obtained in a very efficient manner through the local supply and absorption of energy in those regions which are to form the markings 4, 5. The supply of energy to the outer layer seems to have the effect that bonds between the polymer chains and lateral branches are broken. Ionization of the chains may also play a part. The result is that at least one visual property of the outer layer changes.

If the element, such as the sliding layer in this example, is designed to transfer heat during operation, and especially if also the energy is supplied in the form of heat, it is important that the results of the local energy supply as regards the speed of the temperature change or the level of the temperature achieved surpass the speed of change or the temperature which occur during normal use.

It is furthermore advantageous for an effective marking if the inorganic main chain of the material of the outer layer has organic lateral branches. These may be made to discolor comparatively easily, while the inorganic main chain is not or hardly affected, so that the mechanical properties of the outer layer are substantially maintained.

If the outer layer is designed to be heated during operation, it is advantageous when the organic lateral branches comprise methyl groups. These may be easily made to discolor by heating on the one hand, while on the other hand they are heat-resistant to such a degree that substantially no discoloration will occur at temperatures prevailing in household applications such as ironing and keeping coffee hot.

The energy transfer may take place, for example, through contact with a heat source or in the form of radiation.

A particularly accurate and efficient treatment may here be achieved if, as in the present example, the energy supply is realized in that the sole 1 is operated upon with a laser beam. A large number of different markings, including very fine patterns, can be provided in that the laser beam is controlled in a suitable manner and/or in that suitable masks are used.

The laser treatment is carried out such that a substantial portion of the laser beam is absorbed by the outer layer 3. The energy released during the absorption of the laser radiation by the outer layer 3 causes changes in the visual properties of the outer layer 3. An advantage of this is that the outer surface 6 of the outer layer 3 remains entirely or substantially in its original condition, and accordingly retains substantially the same properties as the portions of the outer layer 3 situated outside the regions of the markings 4, 5. The outer surface 6 of the outer layer 3 remains sufficiently flat and substantially continuous after the treatment, so that the treated regions will have substantially the same mechanical properties as the non-treated regions.

Favorable results are obtained when a laser beam is used with a wavelength of 800–1600 nm, in particular 1000–1100 nm. It is furthermore advantageous for an efficient utilization of the laser energy when the laser has a wavelength at which the outer layer has a comparatively strong absorption.

To obtain a sharp delineation of the markings 4, 5, it is furthermore advantageous that a sol-gel treatment renders it possible to form a very thin outer layer, for example with thicknesses below 50 μm, or even below 25 or 30 μm. In addition, the outer layer 3 is dull-translucent, which enhances the contrast between markings 4, 5 in the zone of the outer layer 3 adjoining the carrier 2 and surrounding regions of the outer layer 3.

The carrier 2 is manufactured from an aluminum alloy. This is advantageous for the fast removal of heat released during the absorption of the laser radiation, whereby firstly a strong thermal shock effect can be obtained in the outer layer 3, and secondly the effect of released heat remains limited to a small region of the outer layer 3.

To obtain a satisfactory application and adhesion, it is furthermore advantageous that the sol-gel substance from which the outer layer 3 is obtained comprises monomers for the formation of the polymer material and 3-glycidyloxypropyltrimethoxysilane (glymo), the quantity of the 3-glycidyloxypropyltrimethoxysilane being less than 50% by weight of the quantity of the monomers. This effect is particularly apparent if the sol-gel substance comprises an alkoxy silicate as the monomer for the formation of the polymer material.

The laser beam with which the regions for the formation of the markings 4 and 5 are treated is a pulsating laser beam in this embodiment. To obtain a distinct marking without excessive attacks on the outer layer 3, it is advantageous here to carry out the pulsatory irradiation with a pulse duration shorter than 30 ns, and in particular shorter than 20 ns.

There are many alternative possibilities for providing the markings 4, 5, and many alternative products which can be obtained thereby, in addition to the example described above of the manner of providing markings and the product obtained thereby in accordance with the embodiment described above.

FIG. 5 shows an example where the outer layer 23 of inorganic polymer material provided on a carrier 22 comprises fillers in the form of particles 24 which have a visual property in the form of their degree of darkness, which can be influenced by a laser. The particles 24 have a darker hue in a region 29 owing to the action of laser beams, thus forming a marking. The fillers prevent the laser radiation from penetrating deeply into the outer layer 23. As a result, substantially exclusively particles in an outermost zone of the outer layer 23 have been discolored in the region 29 of the marking. It is preferable with the use of colored fillers to choose a wavelength for the laser radiation which does not correspond to or is far removed from the wavelength of the color of the fillers so as to promote the effectivity of the laser irradiation.

The fillers preferably comprise fluorided hydrocarbons. This offers the advantage that the fillers at the same time enhance the gliding properties and the water-repelling action of the outer layer 23.

In another embodiment shown in FIG. 6, the outer layer 43 is built up from several (in this example two) layers 50, 51 of an inorganic polymer material. The outer layer 50 has been removed in the region 49 which forms the marking, so that the layer 51 adjoining the carrier 42 is visible. The two layers 50, 51 have clearly differing visual properties, so that a clear marking in the outer layer 43 is obtained in this manner. The removal of the outer layer 50 may again be carried out by means of a laser, but it may also be realized by alternative, for example mechanical means.

In the case of an outer layer composed of two layers having different visual properties, it is also possible to keep the outermost layer at least substantially intact and to change a subjacent layer visually through an action from the outside, for example in that it is made to melt or made to change its color or degree of darkness. This may be achieved, for example, in that the absorption of the radiation is caused to take place selectively in the layer adjoining the carrier and/or in the carrier, and/or in that the layers are so constructed that the layer adjoining the carrier reacts differently to the external action than does the outermost layer.

The outer layer may in principle be self-supporting or may be provided on a different type of carrier, for example made of glass or ceramic material. Furthermore, the outer layer may be a shaver head or a control panel, or it may serve as an easily cleanable protective layer, for example of a hot plate of a coffee maker, instead of as a sliding layer of, for example, an ironing sole.

In view of the above it will be clear to those skilled in the art that many alternative embodiments may exist and be created in addition to those described above.

What is claimed is:

1. An element for a consumer product, the element comprising a carrier of a metal or metal alloy and an outer layer, the outer layer formed by a sol-gel process and comprising a polymer material with an inorganic main chain, wherein at least a region of said outer layer has a visual appearance different from the visual appearance of surrounding regions of said outer layer, wherein the visual appearance of the surrounding regions of the outer layer is dull-translucent, wherein the at least a region forms a marking which is visible to the human eye.

2. An element as claimed in claim 1, wherein said at least a region is integral with the surrounding regions of said outer layer.

3. An element as claimed in claim 1, wherein the different visual appearance of said at least one region forming said marking is achieved by laser radiation.

4. An element as claimed in claim 1, the outer layer further comprising at least one filler material.

5. An element as claimed in claim 4, the outer layer further comprising fluorided hydrocarbons.

6. An element as claimed in claim 1, comprising a further layer of polymer material with an inorganic main chain, wherein said further layer surrounds the at least one region which forms said marking in said outer layer.

7. An element as claimed in claim 1, wherein said inorganic main chain has organic lateral branches.

8. An element as claimed in claim 7, wherein said organic lateral branches comprise methyl groups.

9. An element as claimed in claim 1, wherein the carrier further comprising an anodized layer which supports said outer layer.

10. An element for a consumer product, the element comprising a carrier of a metal or metal alloy and an outer layer, the outer layer formed by a sol-gel process and comprising a polymer material with an inorganic main chain, the outer layer further comprising at least one filler material comprising fluorided hydrocarbons, wherein at least a region of said outer layer has a visual appearance different from the visual appearance of surrounding regions of said outer layer, wherein the visual appearance of the surrounding regions of the outer layer is dull-translucent, wherein the at least a region forms a marking which is visible to the human eye.

11. An element for a consumer product, the element comprising a carrier of a metal or metal alloy and an outer layer, the outer layer formed by a sol-gel process and comprising a polymer material with an inorganic main chain, the outer layer comprising a further layer of polymer material with an inorganic main chain, wherein said further layer surrounds the at least one region which forms said marking in said outer layer, wherein at least a region of said outer layer has a visual appearance different from the visual appearance of surrounding regions of said outer layer, wherein the visual appearance of the surrounding regions of the outer layer is dull-translucent, wherein the at least a region forms a marking which is visible to the human eye.

* * * * *